United States Patent
Yang et al.

(10) Patent No.: US 10,342,002 B2
(45) Date of Patent: Jul. 2, 2019

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/504,954

(22) PCT Filed: Sep. 16, 2015

(86) PCT No.: PCT/KR2015/009700
§ 371 (c)(1),
(2) Date: Feb. 17, 2017

(87) PCT Pub. No.: WO2016/043513
PCT Pub. Date: Mar. 24, 2016

(65) Prior Publication Data
US 2017/0280425 A1      Sep. 28, 2017

Related U.S. Application Data

(60) Provisional application No. 62/050,785, filed on Sep. 16, 2014, provisional application No. 62/053,232, filed on Sep. 22, 2014.

(51) Int. Cl.
*H04W 72/04* (2009.01)
*H04W 72/02* (2009.01)
(Continued)

(52) U.S. Cl.
CPC .......... *H04W 72/042* (2013.01); *H04L 5/001* (2013.01); *H04L 5/0053* (2013.01); *H04W 16/14* (2013.01); *H04W 72/02* (2013.01)

(58) Field of Classification Search
None
See application file for complete search history.

(56) References Cited

U.S. PATENT DOCUMENTS

2013/0114574 A1* 5/2013 Ng ................. H04W 56/0015
                                                          370/336
2013/0195073 A1    8/2013 Chen et al.
(Continued)

FOREIGN PATENT DOCUMENTS

| WO | WO 2012/039656 A1 | 3/2012 |
| WO | WO 2012/077971 A2 | 6/2012 |
| WO | WO 2013/063808 A1 | 5/2013 |

*Primary Examiner* — George C Atkins
(74) *Attorney, Agent, or Firm* — Birch, Stewart, Kolasch & Birch, LLP

(57) ABSTRACT

The resent invention relates to a wireless communication system, and particularly to a method and device for same, the method including the steps of: receiving, from a base station, L1 information about M number of UCells (M≤N) on which downlink resources are temporarily configured, wherein M number of UCells (M≤N) are a subset of N number of UCells; selectively aggregating K number of UCells (K<M) from among N number of UCells depending on a terminal's cell aggregation capability; and communicating with the base station by using the aggregated K number of UCells.

8 Claims, 9 Drawing Sheets

(51) Int. Cl.
*H04W 16/14* (2009.01)
*H04L 5/00* (2006.01)

(56) References Cited

U.S. PATENT DOCUMENTS

| | | | |
|---|---|---|---|
| 2013/0242821 A1* | 9/2013 | Wei | H04B 7/2615 370/280 |
| 2013/0336156 A1* | 12/2013 | Wei | H04L 5/001 370/252 |
| 2014/0043979 A1 | 2/2014 | Etemad et al. | |
| 2015/0173009 A1* | 6/2015 | Vallath | H04W 48/18 370/329 |
| 2015/0223243 A1* | 8/2015 | Tabet | H04W 28/085 370/330 |
| 2016/0007373 A1* | 1/2016 | Davydov | H04L 5/001 370/329 |
| 2016/0014753 A1* | 1/2016 | Wu | H04B 7/022 370/280 |
| 2016/0037503 A1* | 2/2016 | Wu | H04W 72/0406 370/329 |

* cited by examiner

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is the National Phase of PCT International Application No. PCT/KR2015/009700, filed on Sep. 16, 2015, which claims priority under 35 U.S.C. 119(e) to U.S. Provisional Application No. 62/050,785, filed on Sep. 16, 2014, and 62/053,232 filed on Sep. 22, 2014, all of which are hereby expressly incorporated by reference into the present application.

BACKGROUND OF THE INVENTION

Field of the Invention

The present invention relates to a wireless communication system, and more particularly, to a method and apparatus for transmitting/receiving a wireless signal. The wireless communication system includes a CA-based (Carrier Aggregation-based) wireless communication system.

Discussion of the Related Art

Wireless communication systems have been widely deployed to provide various types of communication services including voice and data services. In general, a wireless communication system is a multiple access system that supports communication among multiple users by sharing available system resources (e.g., bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

SUMMARY OF THE INVENTION

An object of the present invention is to provide a method of efficiently performing a procedure of transmitting and receiving a radio signal and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of performing communication, which is performed by a user equipment (UE) in a wireless communication system, includes the steps of receiving L1 (layer 1) information on M (M≤N) number of UCells to which a downlink resource is temporarily set among N number of UCells (unlicensed band cells) from an eNB, selectively aggregating K (K<M) number of UCells from among the N number of UCells based on cell aggregation capability of the UE, and performing communication with the eNB using the K number of aggregated UCells.

To further achieve these and other advantages and in accordance with the purpose of the present invention, according to a different embodiment, a user equipment (UE) configured to perform communication in a wireless communication system includes an RF (radio frequency) module and a processor, the processor configured to receive L1 (layer 1) information on M (M≤N) number of UCells to which a downlink resource is temporarily set among N number of UCells (unlicensed band cells) from an eNB, the processor configured to selectively aggregate K (K<M) number of UCells from among the N number of UCells based on cell aggregation capability of the UE, the processor configured to perform communication with the eNB using the K number of aggregated UCells.

Preferably, the K number of UCells can be selected from among the M number of UCells as follows.
  UCell having a lower cell index is preferentially selected,
  UCell having a wider system bandwidth is preferentially selected,
  If time duration of a downlink resource temporarily set to UCell is long, the UCell is preferentially selected.

Preferably, the N number of UCells are divided into UCell groups in a unit of K number of UCells and a frequency can be switched in a unit of a UCell group based on a pattern according to time.

Preferably, a frequency can be switched for UCells different from the N number of UCells only among the K number of UCells in a state that the frequency is set to the K number of UCells in advance among the N number of UCells.

Preferably, the L1 information can be received on PDCCH (physical downlink control channel).

Preferably, the L1 information can be received on an LCell (licensed band cell).

Preferably, the wireless communication system may correspond to a 3GPP ($3^{rd}$ generation partnership project) wireless communication system.

According to the present invention, it is able to efficiently transmit and receive a radio signal in a wireless communication system. And, it is able to provide a method of performing CA for efficiently securing an available resource section and an apparatus therefor.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
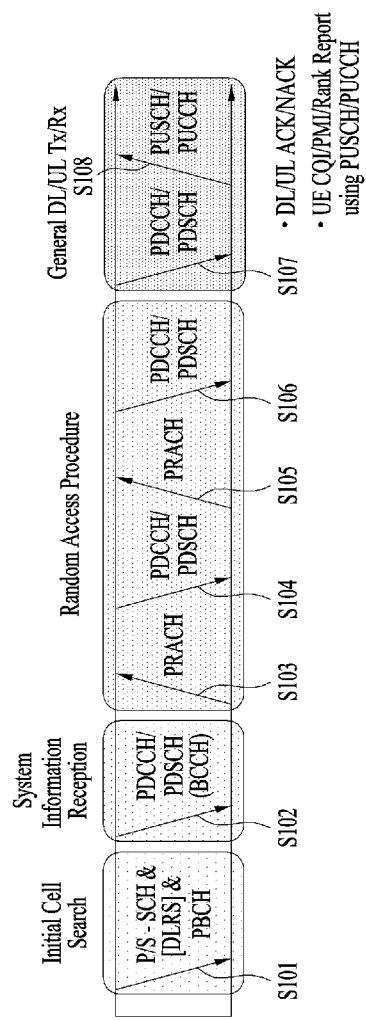
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
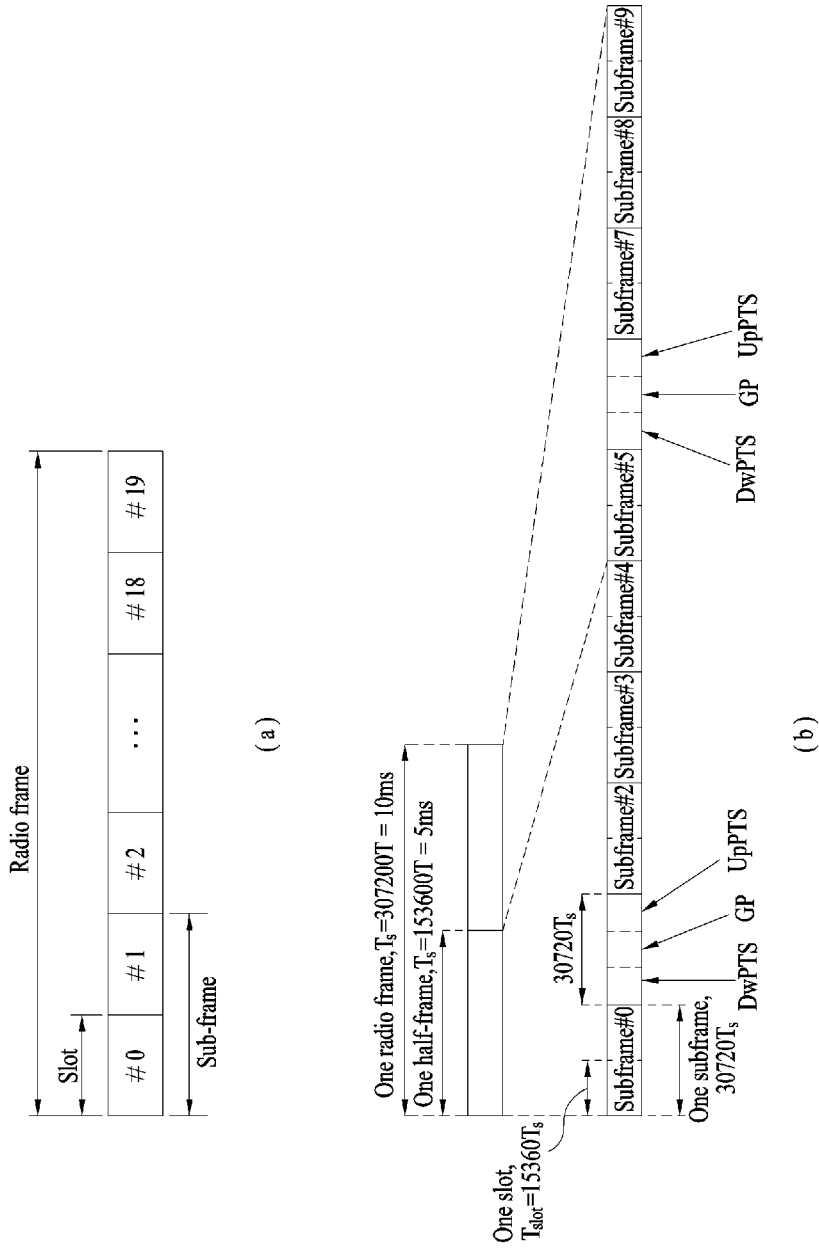
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2($a$) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2($b$) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
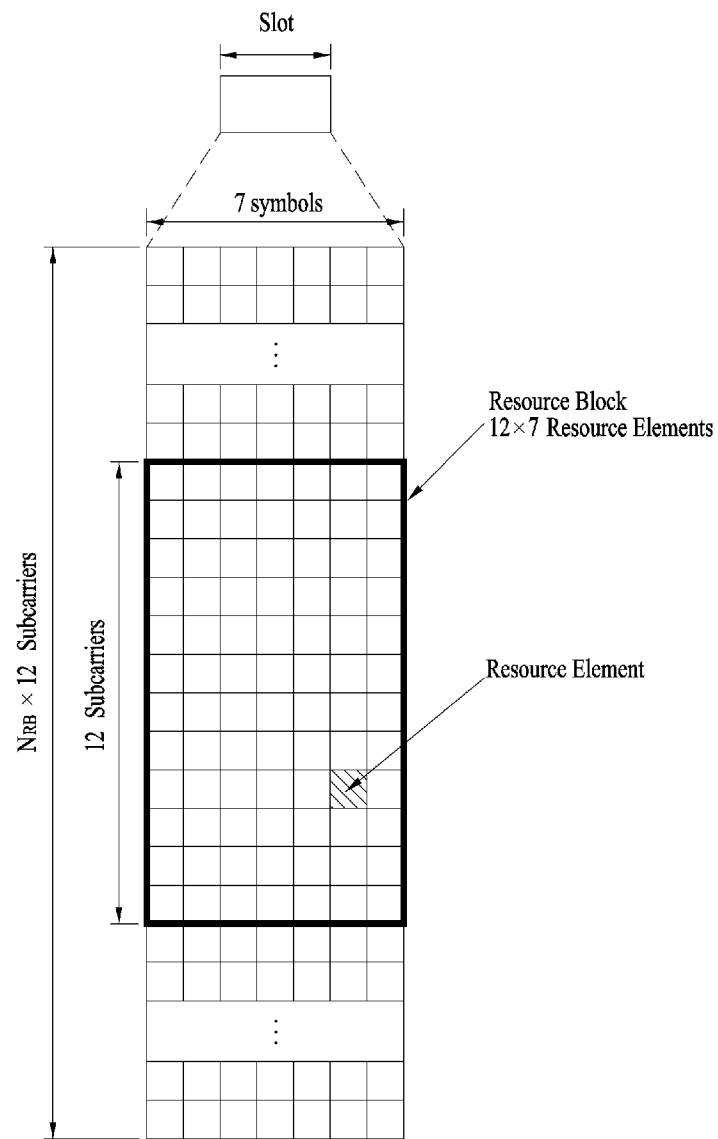
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
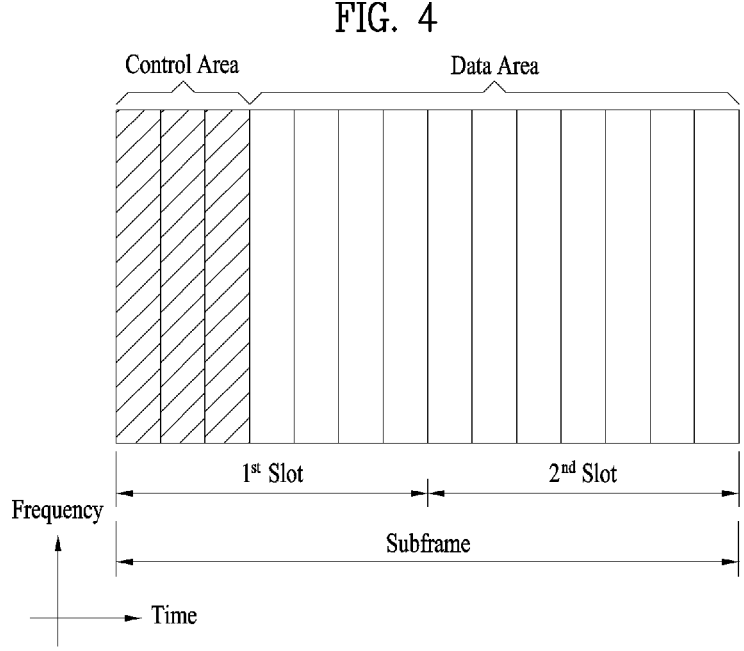
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DCI format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DCI formats 0/1A is used to carry DCI format 0 or DCI format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG 4 QPSK symbols are mapped to one REG REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
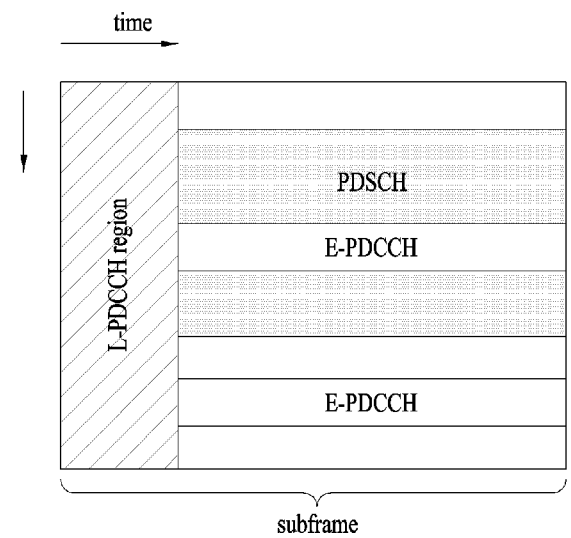
FIG. 5 illustrates an example of Enhanced Physical Downlink Control Channel (EPDCCH).

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (ports) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
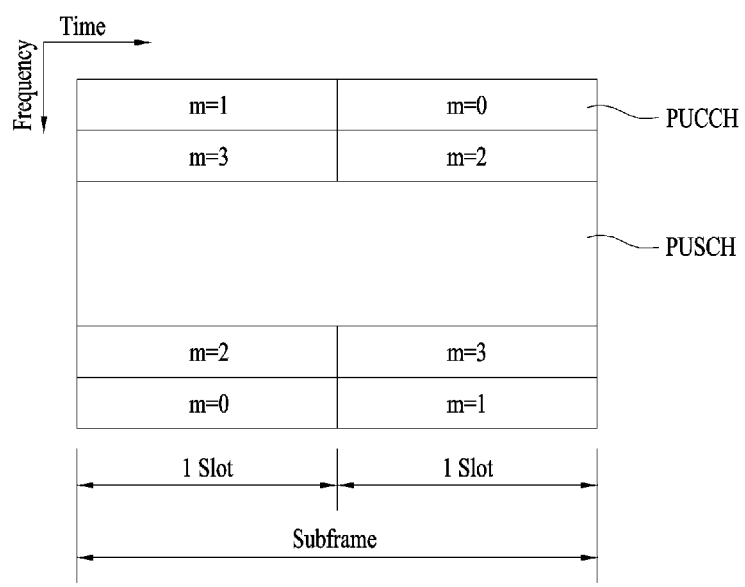
FIG. 6 illustrates the structure of an uplink subframe.

FIG. 6 illustrates an uplink subframe structure.

Referring to FIG. 6, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain.

The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

Figure 7:
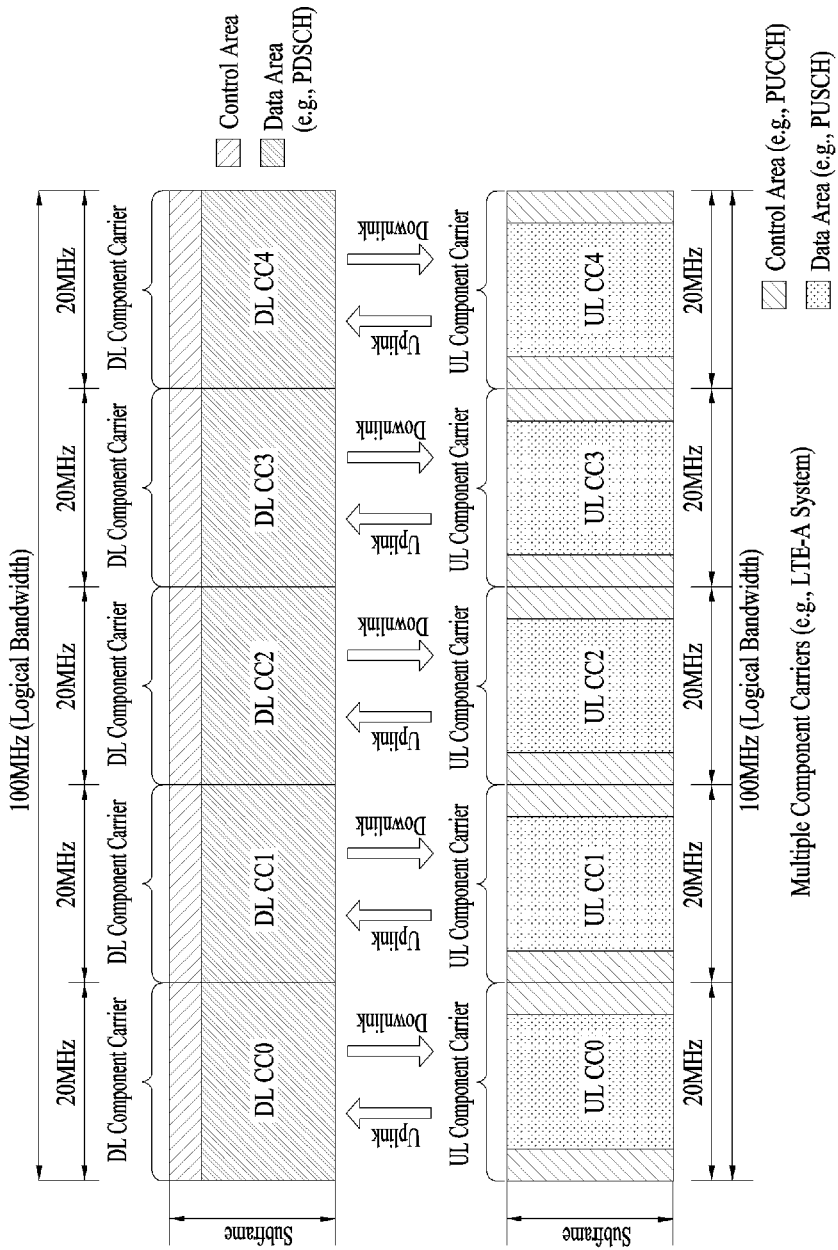
FIG. 7 illustrates a carrier aggregation (CA)-based wireless communication system.

FIG. 7 illustrates carrier aggregation (CA) communication system.

Referring to FIG. 7, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
  No CIF
  CIF enabled: a PDCCH on a DL CC can be used to allocate a PDSCH or PUSCH resource on a specific DL/UL CC from among a plurality of aggregated DL/UL CCs using the CIF.
  LTE DCI format extended to have CIF
    CIF corresponds to a fixed x-bit field (e.g. x=3) (when CIF is set)
    CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 8:
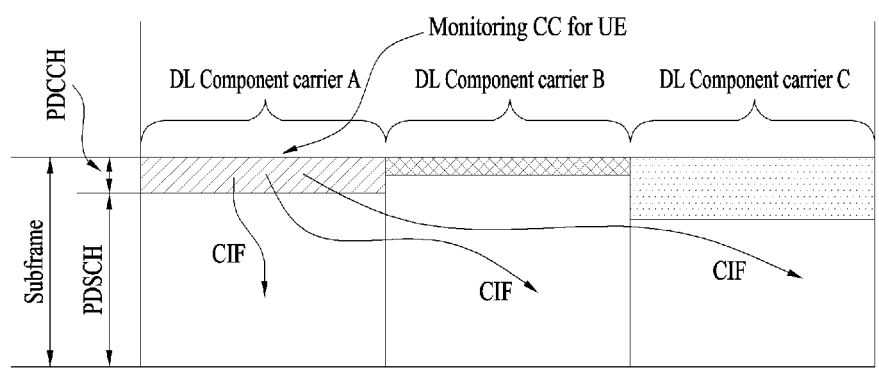
FIG. 8 illustrates a cross-carrier scheduling.

FIG. 8 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Signal Transmission and Reception in LTE-U

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 μs.

Figure 9:
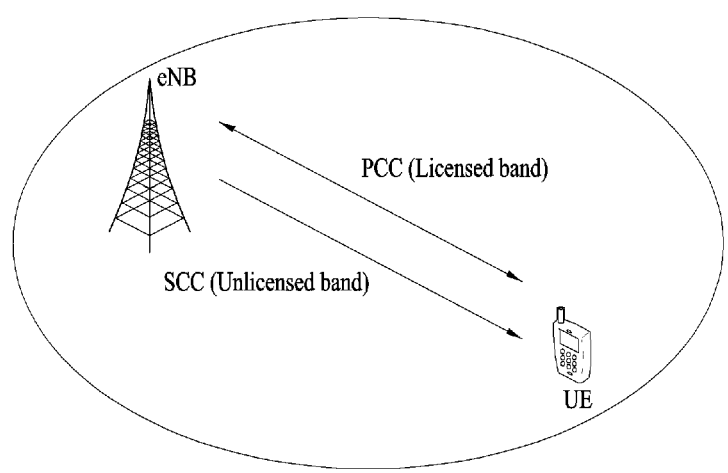
FIG. 9 illustrates carrier aggregation of a licensed band and an unlicensed band.

FIG. 9 illustrates carrier aggregation of a licensed band and an unlicensed band. Referring to FIG. 9, an eNB may transmit a signal to a UE or the UE may transmit a signal to the eNB in a situation of carrier aggregation of the licensed band (hereinafter, LTE-A band) and the unlicensed band (hereinafter, LTE-U band). Here, the center carrier or frequency resource of the license band may be interpreted as a PCC or PCell, and the center carrier or frequency resource of the unlicensed band may be interpreted as an SCC or SCell.

Figure 10:
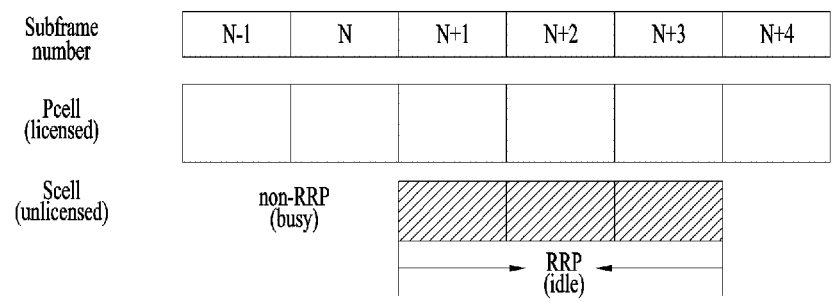
FIGS. 10 and 11 illustrate a resource reservation method on an unlicensed band.
Figure 11:
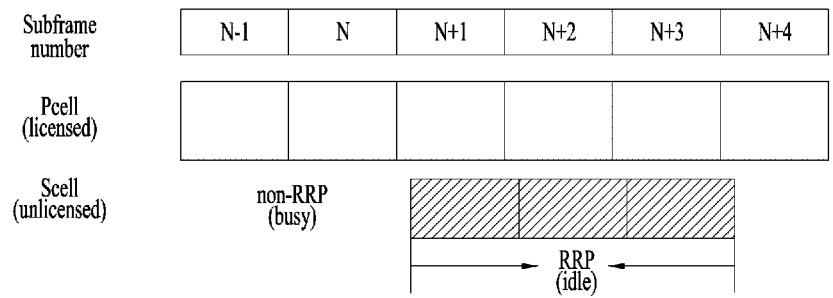

FIGS. 10 and 11 illustrate a method of occupying resources within a licensed band. In order to perform communication between an eNB and a UE in an LTE-U band, the band should be occupied/secured for a specific time period through contention with other communication systems (e.g., Wi-Fi) unrelated to LTE-A. For simplicity, the time period occupied/secured for cellular communication in the LTE-U band is referred to as a reserved resource period (RRP). There are various methods for securing the RRP interval. For example, a specific reservation signal may be transmitted such that other communication system devices such as Wi-Fi can recognize that the corresponding wireless channel is busy. For example, the eNB may continuously transmit an RS and data signal such that a signal having a specific power level or higher is continuously transmitted during the RRP interval. If the eNB has predetermined the RRP interval to occupy in the LTE-U band, the eNB may pre-inform the UE of the RRP interval to allow the UE to maintain the communication transmission/reception link during the indicated RRP interval. The RRP interval information may be transmitted to the UE through another CC (e.g., the LTE-A band) connected through carrier aggregation.

For example, an RRP interval consisting of M consecutive subframes (SF) may be configured. Alternatively, one RRP interval may be configured as a set of non-consecutive SFs (not shown). Here, the eNB may pre-inform the UE through higher layer signaling (e.g., RRC or MAC signaling) or a physical control/data channel of the value of M and the usage of the M SFs (using PCell). The start time of the RRP interval may be set periodically by higher layer signaling (e.g., RRC or MAC signaling). Alternatively, the start time of the RRP interval may be specified through physical layer signaling (e.g., (E)PDCCH) in SF #n or SF # (n-k) when the start time of the RRP interval needs to be set to SF #n. Here, k is a positive integer (e.g., 4).

Figure 13:
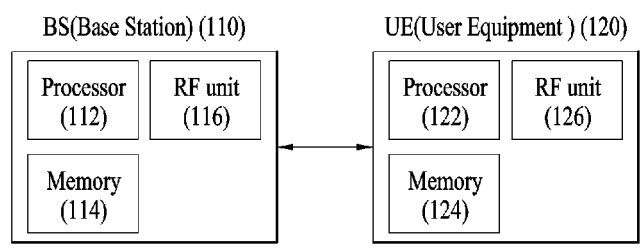
FIG. 13 illustrates a base station and a user equipment applicable to an embodiment of the present invention.

The RRP may be configured such that the SF boundary and the SF number/index thereof are aligned with the PCell (FIG. 2) (hereinafter, "aligned-RRP"), or configured to support the format in which the SF boundary or the SF number/index is not aligned with the PCell (hereinafter, "floating-RRP") (FIG. 13). In the present invention, the SF boundaries being aligned between cells may mean that the interval between SF boundaries of two different cells is shorter than or equal to a specific time (e.g., CP length or X μs (X≥0)). In addition, in the present invention, a PCell may refer to a cell that is referenced in order to determine the SF (and/or symbol) boundary of a UCell in terms of time (and/or frequency) synchronization.

As another example of operation in the unlicensed band performed in a contention-based random access scheme, the eNB may perform carrier sensing before data transmission/reception. If a current channel status of the SCell is determined as being an idle when the channel status is checked for whether it is busy or idle, the eNB may transmit a scheduling grant (e.g., (E)PDCCH) through the PCell (LTE-A band) or the SCell (LTE-U band), and attempt to perform data transmission/reception on the Scell.

As mentioned in the foregoing description, since LTE-U system operates based on carrier sensing on an unlicensed band and has a structure that an available resource section is aperiodically or discontinuously reserved/configured, it is highly probable that data scheduled/transmitted via the structure is to be opportunistically or intermittently performed depending on the resource section which is temporarily configured. Hence, if cells/carriers configured to operate based on LTE-U are semi-statically aggregated using RRC signaling like a legacy CA scheme does, it may be difficult to reserve sufficient available resources depending on load of other competition system (e.g., WiFi) co-located on a corresponding cell/carrier frequency band, carrier sensing performance/result, and the like. This may directly lead to deterioration of UE transmission performance (e.g., throughput).

In the following, the present invention proposes a CA method for efficiently securing an available resource section in a situation that a plurality of cells/carriers (hereinafter, cells) are set. In this case, a plurality of the cells can include one or more cells operating on a licensed band and one or more cells in which an available resource section is aperiodically or discontinuously reserved/configured. The present invention can be applied to LTE-U system opportunistically operating on an unlicensed band based on carrier sensing. And, the present invention can be applied to a situation that LTE-U scheme is set to a plurality of cells. The present invention can also be comprehended as a scheme of (dynamically) changing a Ucell belonging to a set of CA configuration cells set to a UE.

An LTE-U based cell (e.g., Scell) is defined as a Ucell and a resource section aperiodically reserved/configured in the Ucell is defined as an RRP. The RRP corresponds to a resource discontinuously/aperiodically configured depending on a carrier sensing result. The RRP can be defined as follows in the aspect of a UE operation and an assumption.

1) A period during which a UE performs a (time/frequency) synchronization operation for a Ucell, or a period assuming that a synchronization signal (e.g., PSS, SSS) is transmitted (from an eNB) for the synchronization operation, 2) A period during which a UE performs a channel state measuring operation on a Ucell, or a period assuming that a reference signal (e.g., CRS (cell-specific reference signal) is transmitted (from an eNB) for the channel state measuring operation, 3) A period during which a UE performs a (DL/UL grant) DCI detecting operation on a Ucell or in the Ucell, 4) When a UE performs a (temporary) buffering operation on a signal received from a Ucell, a period during which an RRP performs all or a specific part of the operations/assumptions in the Ucell.

A center frequency of a Ucell is defined as a (DL/UL) UCC. A cell (Pcell, Scell) operating on a legacy licensed band is defined as an Lcell and a center frequency for the Lcell is defined as a (DL/UL) LCC. For clarity, a case of scheduling a Ucell from the same cell and a case of scheduling the Ucell from a different cell (e.g., Pcell) are referred to as self-CC scheduling and cross-CC scheduling, respectively. And, a cell and a carrier (e.g., CC) are commonly referred to as a cell. A carrier/carrier-frequency of a cell corresponds to an operation frequency (e.g., center frequency) of the cell. In particular, the carrier/carrier-frequency may correspond to a DL operation frequency (e.g., center frequency).

For clarity, in the following, assume that one licensed band and one unlicensed band are aggregated and a UE is configured to perform wireless communication via the aggregated band. For example, assume a CA situation between a Pcell operating on a legacy licensed band and an Scell operating with LTE-U scheme. Yet, the present invention can also be applied to a situation that a plurality of licensed bands and a plurality of unlicensed bands are used via a carrier aggregation scheme. And, the present invention can also be applied to a case that a signal is transceived between an eNB and a UE on a unlicensed band only. And, the methods proposed by the present invention can be extensively applied not only to 3GPP LTE system but also to a system having a different characteristic. In the following, such a terminology as a base station can be used as a comprehensive term including an RRH (remote radio head), an eNB, TP (transmission point), an RP (reception point), a relay, and the like.

(1) Basic CA Method for Ucell to which RRP is Set

Prior to the explanation on the method, parameters are defined.

1) N: Total number of candidate Ucells configured as cells capable of performing CA. The cells can be semi-statically configured using an RRC signal or the like and RRM (radio resource management) can be performed on the cells.

2) K: Maximum number of cells (or a specific value equal to or less than the maximum number) capable of being CA by a UE at the same time. The cells can be dynamically configured using a MAC/L1 signal and data transmission and reception can be performed through the cells. The MAC/L1 signal can be received via Lcell.

3) M: Number of Ucells to which RRP is set among N number of candidate Ucells.

It may configure a parameter to have such a relation as N>K and N≥M. In this case, the K may correspond to the remaining CA capability (or a specific value equal to or less than the remaining CA capability) except (already CA) Lcell.

Under the aforementioned assumption, first of all, an eNB can perform carrier sensing in a state N number of candidate Ucells (hereinafter, Ucell N) are set to a UE in advance using higher layer signaling (e.g., RRC/MAC signaling). Subsequently, the eNB can inform the UE of information on Ucells to which RRP is set (i.e., M number of cells) (hereinafter, Ucell_M) and information on Ucells in which RRP is not reserved (hereinafter, Ucell-info) among the N number of candidate Ucells at appropriate timing using L1 signaling (e.g., PDCCH). Having received the Ucell-info, the UE can configure a set of CA configuration cells using schemes described in the following according to a size relation between parameters. The Ucell-info can be received via Lcell.

1) if K≥M: CA is configured for the whole of the M number of Ucells (i.e., Ucell_M)

2) if K<M: CA is configured by selecting K number of Ucells (hereinafter, Ucell_K) from among the M number of Ucells (i.e., Ucell_M)

If K is less than M (K<M), the K number of Ucells (i.e., Ucell_K) can be selected based on a predefined rule or a predetermined priority. The predefined rule/priority can be determined on the basis of a cell index of Ucell, RRP length, BW of Ucell system, or the combination thereof. As an example, it may be able to preferentially select a Ucell having a lower cell index and/or a Ucell having a long RRP and a wider system BW (to reserve more time/frequency RRP resources).

(2) CA Procedure for Reducing Frequency Switching Operation

The method (1) has a merit in that it is able to perform CA on Ucells using a simple scheme based on a specific rule/priority or a scheme of increasing reservation of RRP resources. On the contrary, since the method (1) causes a frequent carrier-frequency switching, i.e., a frequency switching operation, between Ucells, a burden/complexity of a UE may increase. Hence, in order to efficiently secure an RRP resource while the frequency switching operation is reduced, the present invention proposes CA procedures described in the following.

1) Step 1: Set a carrier-frequency to the specific K number of Ucells in advance at first timing among N number of candidate Ucells and standby A. 'The specific K number of Ucells' can be determined based on the rule/priority configuration mentioned earlier in the method (1) or can be directly designated by the eNB.

2) Step 2: Compare M number of Ucells to which RRP is set with K number of Ucells to which the carrier-frequency is set in advance (based on carrier sensing or eNB information)

A. For clarity, the carrier-frequency, freq corresponding to the M number of Ucells, freq corresponding to the K number of Ucells are referred to as freq, new-freq, and old-freq, respectively.

B. When K is equal to or greater than M (K≥M), if K number of old-freq include all of M number of new-freq:
  i. CA is configured for the M number of new-freq (without frequency switching) and the remaining K-M number of freq among the K number of old-freq maintain standby state.

C. When K is equal to or greater than M (K≥M), if K number of old-freq includes M1 number of new-freq only among M number of new-freq and does not include the remaining M2 number of new-freq:
  i. CA is configured for the M number of freq among the K number of old-freq (e.g., old-freq corresponding to the M1 number of new-freq is maintained as it is among the K number of old-freq and the specific M2 number of freq is switched to the M2 number of new-freq among the K-M1 number of old-freq) and the K-M number of freq maintains standby.
  ii. 'The specific M2 number of freq among the K-M1 number of old-freq' can be selected based on the rule/priority configuration mentioned earlier in the method (1).

D. When K is less than M (K<M), if all of the K number of old-freq belong to the M number of new-freq:
  i. CA is configured for the K number of old-freq (without frequency switching)

E. When K is less than M (K<M), if K1 number of old-freq among the K number of old-freq belongs to the M number of new-freq only and K2 number of old-freq does not belong to the M number of new-freq:
  i. CA is configured for the K number of freq (e.g., K1 number of old-freq among the K number of old-freq is maintained as it is and the remaining K2 number of old-freq is switched to the specific K2 number of freq among the M-K1 number of new-freq).
  ii. 'The specific K2 number of freq among the M-K1 number of new-freq' can be selected based on the rule/priority configuration mentioned earlier in the method (1).

Step 3: Perform the step 2 whenever the Ucell-info, i.e., information on RRP configuration (whether or not RRP exist in UCell), is received from the eNB.

Meanwhile, it may consider a structure that information on whether RRP is configured in Ucell is indicated by a specific signal (i.e., a preamble) transmitted by the Ucell itself. In this case, it may consider a parameter L corresponding to 'the maximum number of cells in which a UE is able to detect a preamble at the same time' as additional UE capability accompanied with Ucell CA. The UE can inform the eNB of the UE capability at appropriate timing. In this case, it may be able to basically configure such a relation as L≥N and L≥K. The same operation mentioned earlier in the proposed method can be applied to the remaining CA procedure except a part that information on whether RRP is configured in the N number of candidate Ucells is individually received from a preamble transmitted by a Ucell itself.

The proposed method can be applied whenever the Ucell-info is received from the eNB or can be applied in a unit of prescribed time (e.g., time including a plurality of timings at which the Ucell-info is received) interval/period to avoid too frequent frequency-switching operation.

As a different method for performing the Ucell CA, it may be able to configure RRP using a TDM scheme between Ucell groups (in the aspect of a UE) in a state that a plurality of Ucell groups are configured in advance by grouping the N number of candidate Ucells in the K number (or less than K) of units. For example, the UE can periodically perform frequency-switching in a unit of a Ucell group in accordance with a TDM pattern. A Ucell group can include the K number (or less than K) of Ucells. One Ucell may belong to one Ucell group only or may commonly belong to a plurality of Ucell groups. A TDM pattern between Ucell groups can be identically or differently assigned to each UE. The aforementioned CA scheme can be effective in terms of UE load distribution, interference randomization, and the like.

When CA is configured for a plurality of Ucells, timing of setting (available) RRP to a plurality of the Ucells can be identically configured (in consideration of UE complexity, and the like). By doing so, it may configure RRPs of Ucells different from each other not to be partly overlapped (in time axis).

Meanwhile, there may exist a UE equipped with capability capable of performing signal processing (e.g., DL reception) for a wide band on a specific frequency band using a single RF. In this case, (if the proposed scheme is applied), although a frequency-switching operation is not actually requested on the frequency band, an eNB may assume the frequency-switching operation of the UE in a state that the eNB fails to recognize the capability of the UE. As a result, it is inefficiency in terms of resource utilization and scheduling latency. In consideration of this, it may consider a method of reporting capability information (e.g., a frequency band/range on which the UE is able to perform signal processing (e.g., DL reception) at the same time using a single RF only and/or the maximum number of cells capable of being aggregated on the frequency band/range, maximum BW, or maximum data transmission rate) of the UE to the eNB. By doing so, the eNB can perform scheduling (e.g., resource allocation) and a DL signal (e.g., (E)PDCCH, PDCCH) transmission operation in consideration of actual capability of the UE.

(3) Method of Configuring Center Frequency/Operation Band of LTE-U

When LTE-U system is deployed to an unlicensed band (i.e., Ucell), other system including WiFi and the like may operate on the unlicensed band in a manner of being previously assigned to the unlicensed band. In this case, in order for the LTE-U system and other system to efficiently compete and co-exist on the unlicensed band, it may be preferable to match a system operation frequency band and/or a center frequency between the two heterogeneous systems.

For example, it may assume a situation that a WiFi system having operation bands described in the following is deployed to an unlicensed band of 40 MHz band (e.g., X~(X+40) MHz): (1) WiFi-band 1: 20 MHz band (i.e., X~(X+20) MHz) having (X+10) MHz as a center frequency, (2) WiFi-band 2: 20 MHz band (i.e., (X+20)~(X+40) MHz) having (X+30) MHz as a center frequency.

In the situation, it may assume a case that a center frequency of LTE-U system having an operation band of 20 MHz is assigned by (X+20) MHz on the unlicensed band (i.e., (X+10)~(X+30) MHz) (hereinafter, LTE-U band). In this case, since one LTE-U band is overlapped with a plurality of WiFi bands (1 and 2), it may be able to anticipate operations described in the following.

1) The LTE-U system can secure/configure RRP on the LTE-U band only when both the Wi-Fi bands 1 and 2 are idle via carrier sensing. In particular, if either the WiFi band 1 or the WiFi band 2 is busy, it is impossible for the LTE-U system to secure/configure the RRP on the LTE-U band.

2) The WiFi system can secure a transmission opportunity only when the LTE-U band is idle via carrier sensing. In particular, if the LTE-U band is busy, it is impossible for the WiFi system to secure a transmission opportunity on both the WiFi band 1 and the WiFi band 2.

As a result, it is highly probable that performance is to be degraded in terms of co-existence efficiency.

In consideration of this, it may be able to configure an operation band of the LTE-U band and a center frequency in a manner that one LTE-U band is to be included in one WiFi band only. In particular, it may be able to configure an operation band of the LTE-U band and a center frequency in a manner that one LTE-U band is not overlapped with a plurality of WiFi bands. To this end, it may be able to configure a center frequency of LTE-U band to be matched with a center frequency of a specific WiFi band. If a BW of the LTE-U band is narrower than a BW of the WiFi band (e.g., less than half), it may be able to configure the center frequency of the LTE-U band in a manner that a plurality of LTE-U bands are included in the WiFi band (or LTE-U bands as many as possible are included in the WiFi band).

In addition, in order to reduce UE complexity accompanied with cell search and the like, similar to a legacy LTE system, it may consider a method of configuring a center frequency of LTE-U band with a multiple of a specific frequency unit (e.g., Y [KHz] or Z [MHz]) only. As an example, if 100 KHz-raster in legacy LTE is applied to the proposed method, it may be able to configure a center frequency of the LTE-U band with a multiple of 100 HKz closest to a center frequency of a specific WiFi band. If a BW of the LTE-U band is narrower than a BW of the WiFi band (e.g., less than half), it may be able to configure each of the center frequencies to be a multiple of 100 KHz while a plurality of LTE-U bands are included in one WiFi band (or LTE-U bands as many as possible are included in the WiFi band).

The proposed method can be similarly applied not only to heterogeneous systems such as LTE-U system, WiFi system, etc. i.e., inter-RAT situation, but also to LTE-U systems operating based on a different operator, i.e., inter-operator situation. As a different method, it may be able to differently regulate a center frequency (i.e., operation band) set capable of being possessed by a LTE-U band (on a specific frequency band) depending on a system BW occupied by the LTE band (i.e., Ucell) (by generalizing both the inter-RAT and the inter-operator situations). In addition, it may also be able to differently regulate a center frequency (i.e., operation band) set capable of being possessed by a LTE-U band on a corresponding frequency band depending on a combination between the number of LTE-U bands (i.e., Ucells) deployed to one frequency band and a system BW.

The CA method proposed by the present invention can be applied not only to a cell operating based on aperiodic RRP configuration as LTE-U but also to a general cell operating based on a transmission resource configuration in legacy LTE.

Figure 12:
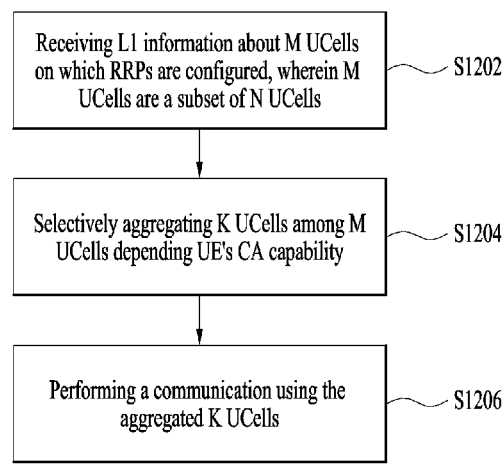
FIG. 12 is a flowchart for a method of performing communication according to one embodiment of the present invention.

FIG. 12 is a flowchart for a method of performing communication according to one embodiment of the present invention.

Referring to FIG. 12, a UE can receive L1 (layer 1) information on the M (M≤N) number of UCells to which a downlink resource is temporarily set among the N number of UCells from an eNB [S1202]. In this case, the temporarily set downlink resource includes RRP. Subsequently, the UE can selectively aggregate K (K<M) number of UCells among the N number of UCells based on cell CA capability of the UE [S1204]. A concrete CA procedure can be performed by the proposed methods (1)~(2) and a frequency/band of UCell can be configured by the proposed method (3). Subsequently, the UE can perform communication with an eNB using the K number of aggregated UCells [S1206]. For example, the UE receives a downlink signal (e.g., DL grant PDCCH/PDSCH, UL grant PDCCH, etc.) from the eNB using the K number of UCells and performs operations in accordance with the downlink signal. In this case, the L1 information can be received via PDCCH. The UE can additionally aggregate UCells in a state that one or more LCells are aggregated. The L1 information is received in the LCell. The wireless communication system may correspond to a 3GPP wireless communication system.

FIG. 13 illustrates a BS and a UE of a wireless communication system, which are applicable to embodiments of the present invention.

Referring to FIG. 13, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention mentioned in the foregoing description may be applicable to a user equipment, a base station, or other devices of wireless mobile communication systems.

What is claimed is:

1. A method of performing communication by a user equipment (UE) in a wireless communication system, the method comprising:
    receiving first layer 1 (L1) information related to M (M≤N) number of unlicensed band cells (UCells) to which a downlink resource is temporarily set among N number of UCells from an eNB;
    receiving second L1 information related to a maximum number of K of UCells that the UE is able to aggregate;
    aggregating all of the M number of UCells, when K is no less than M;
    aggregating K number of UCells selected by the UE from the N number of UCells based on a predetermined rule, without an indication from the eNB related to the selected K number of UCells, when K is less than M; and
    performing communication with the eNB using the aggregated UCells.

2. The method of claim 1, wherein the K number of UCells are selected from the M number of UCells as follows:
    a UCell having a lower cell index is preferentially selected,
    a UCell having a wider system bandwidth is preferentially selected, and
    a UCell having a longer downlink resource is preferentially selected.

3. The method of claim 1, wherein the first and second L1 information are received on a PDCCH (physical downlink control channel).

4. The method of claim 3, wherein the second L1 information is received on an LCell (licensed band cell), and
    wherein the wireless communication system corresponds to a 3GPP (3rd generation partnership project) wireless communication system.

5. A user equipment (UE) configured to perform communication in a wireless communication system, the UE comprising:

a transceiver; and a processor configured to:

receive first layer 1 (L1) information related to M (M≤N) number of unlicensed band cells (UCells) to which a downlink resource is temporarily set among N number of UCells from an eNB, receive second L1 information related to a maximum number K of UCells that the UE is able to aggregate, aggregate all of the M number of UCells, when K is no less than M, aggregate K number of UCells selected by the UE from the N number of UCells based on a predetermined rule, without an indication from the eNB related to the selected K number of UCells, when K is less than M, and perform communication with the eNB using the aggregated UCells.

6. The user equipment of claim 5, wherein the K number of UCells are selected from the M number of UCells as follows:

a UCell having a lower cell index is preferentially selected, a UCell having a wider system bandwidth is preferentially selected, and a UCell having a longer downlink resource is preferentially selected.

7. The user equipment of claim 5, wherein the first and second L1 information are received on a PDCCH (physical downlink control channel).

8. The user equipment of claim 7, wherein the second L1 information is received on an LCell (licensed band cell), and wherein the wireless communication system corresponds to a 3GPP (3rd generation partnership project) wireless communication system.

* * * * *